Figure 1:
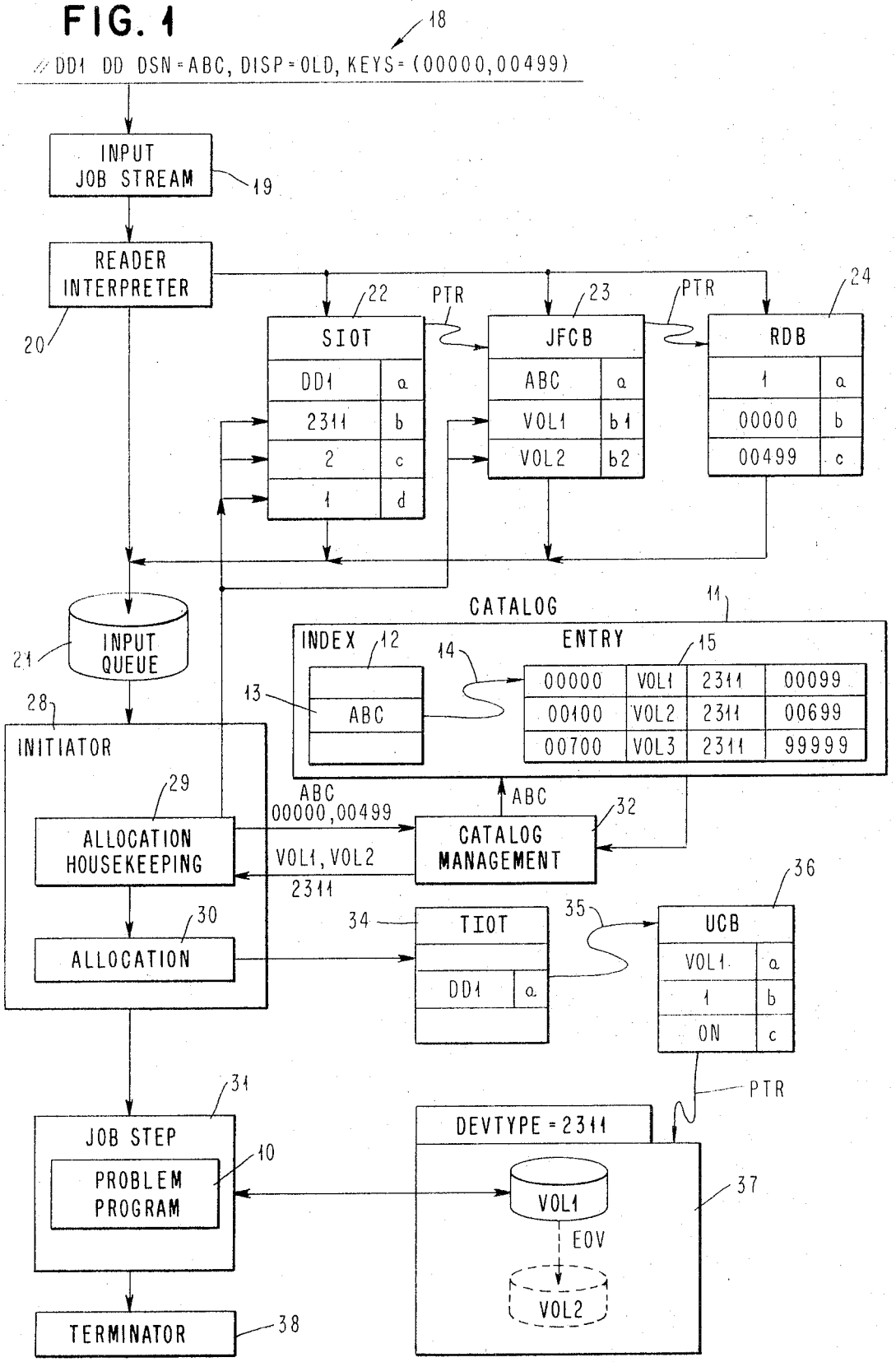
Figure 2:
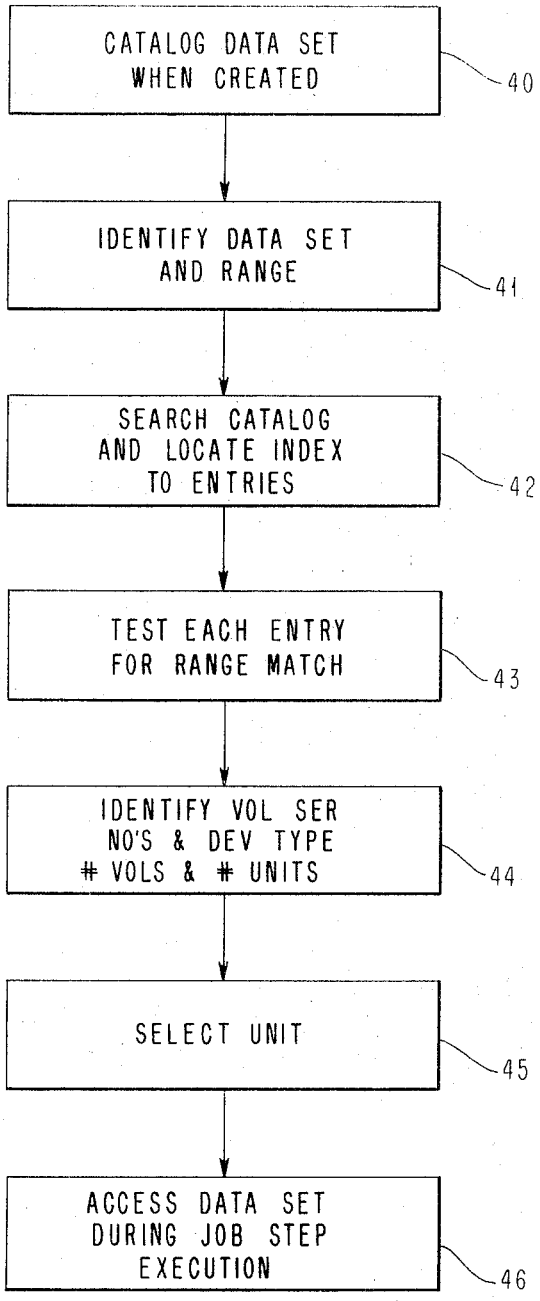

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 9

T927,007

SELECTIVE VOLUME ACCESSING

Donald P. Casey and Glenford J. Meyers, Poughkeepsie, and Harold G. Opdyke, Wappingers Falls, N.Y., and Robert J. St. Germaine, Boca Raton, Fla., assignors to International Business Machines Corporation, Armonk, N.Y.

Continuation of application Ser. No. 231,318, Mar. 2, 1972. This application Sept. 10, 1973, Ser. No. 395,484

Int. Cl. G06f *7/28, 13/06, 3/00*

U.S. Cl. 444—1

2 Sheets Drawing. 15 Pages Specification

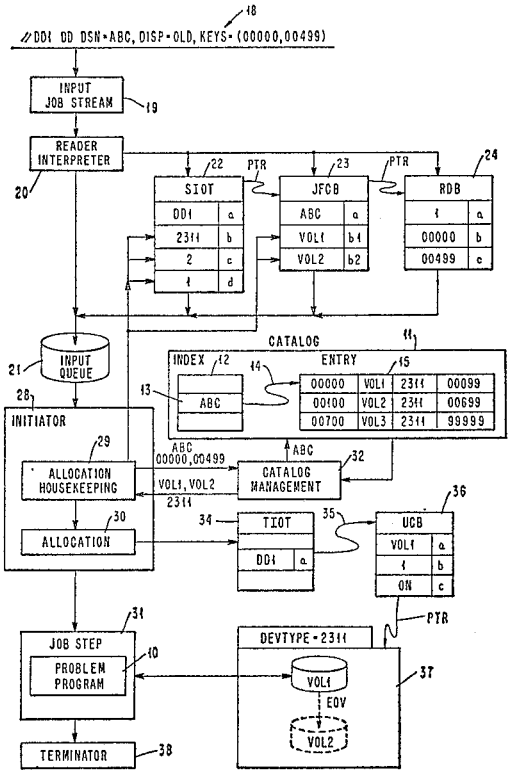

Data, which is to be processed in a data processing system, is organized into data sets stored in volumes. To aid programmers, the system includes a catalog used to locate the data sets. Large data sets are stored in multiple volumes in an order dependent on a set of values or keys associated with the data. Access to a data set is accomplished by specifying merely the data set name or identifier and the range or ranges of keys of the data to be processed. The system, in response to such specification, searches the catalog to locate the data set and volumes containing the desired data, and I/O devices are allocated, as the job is being prepared in the system for execution.

SELECTIVE VOLUME ACCESSING

Original Filed March 2, 1972 2 Sheets-Sheet 1